(12) United States Patent  (10) Patent No.: US 9,342,774 B1
Lin  (45) Date of Patent: May 17, 2016

(54) SMART CARD WITH A FINGERPRINT IDENTIFYING MODULE

(71) Applicant: Wu-Hsu Lin, Taichung (TW)

(72) Inventor: Wu-Hsu Lin, Taichung (TW)

( * ) Notice: Subject to any disclaimer, the term of this patent is extended or adjusted under 35 U.S.C. 154(b) by 0 days.

(21) Appl. No.: 14/794,463

(22) Filed: Jul. 8, 2015

(51) Int. Cl.
*G06K 19/06* (2006.01)
*G06K 19/07* (2006.01)
*G06K 19/077* (2006.01)

(52) U.S. Cl.
CPC .......... *G06K 19/0718* (2013.01); *G06K 19/077* (2013.01); *G06K 19/07728* (2013.01)

(58) Field of Classification Search
CPC ............ G06K 19/0718; G06K 19/077; G06K 19/07728; G06K 9/0002; G06K 9/00053; G06Q 20/02; G06Q 20/18; G06Q 20/32; G06Q 20/327; G06Q 20/341; G06Q 20/3415; G06Q 20/3674; G06Q 20/40; G06Q 20/401; G06Q 20/40975
USPC .......................................... 235/380, 439, 492
See application file for complete search history.

(56) References Cited

U.S. PATENT DOCUMENTS

| | | | | |
|---|---|---|---|---|
| 5,917,913 A | * | 6/1999 | Wang | G06Q 20/401 |
| | | | | 235/380 |
| 6,848,617 B1 | * | 2/2005 | Fries | G06K 9/0002 |
| | | | | 235/380 |
| 8,276,816 B2 | * | 10/2012 | Gardner | G06K 9/00026 |
| | | | | 235/380 |
| 2007/0223179 A1 | * | 9/2007 | Cheng | H05K 5/0273 |
| | | | | 361/600 |
| 2012/0049309 A1 | * | 3/2012 | Kiyomoto | G06K 19/0718 |
| | | | | 257/434 |

FOREIGN PATENT DOCUMENTS

| | | |
|---|---|---|
| TW | M372978 U | 1/2010 |
| TW | M407449 U | 7/2011 |
| TW | I423142 B | 1/2014 |

* cited by examiner

*Primary Examiner* — Seung Lee
(74) *Attorney, Agent, or Firm* — Birch, Stewart, Kolasch & Birch, LLP

(57) ABSTRACT

The smart card has a supporting body, a flexible circuit board, a holding frame, a fingerprint identifying module, and a cover sheet. The flexible circuit board is attached to the top of the supporting body and has a data chip. The holding frame is mounted on the flexible circuit board and has a holding recess and an opening. The fingerprint identifying module is mounted in the holding frame and has an identifying chip, a flexible electrical connection sheet, and a hard supporting board to provide a supporting effect to the identifying chip. The cover sheet is attached to the top of the flexible circuit board and has an identifying window. The identifying window is defined through the cover sheet and corresponds to the identifying chip in position to allow the identifying chip to be exposed from the identifying window.

10 Claims, 7 Drawing Sheets

SMART CARD WITH A FINGERPRINT IDENTIFYING MODULE

BACKGROUND OF THE INVENTION

1. Field of the Invention

The present invention relates to a smart card, and more particularly to a smart card having a fingerprint identifying module.

2. Description of Related Art

A smart card, so called IC or intellectual card, is a portable plastic card that can read and store data in an induction or contacting manner and is widely applied as public transport tickets, electronic purses, ATM cards, credit cards or identification badges. To improve the fraud-proof effect of the smart card, TW Patents No. M372978, M407449 and I423142 respectively disclose a smart card having a fingerprint identifying function.

With reference to FIG. 7, a conventional smart card 90 having a fingerprint identifying function substantially comprises a supporting body 91, a flexible circuit board 92, and a cover sheet 93. The supporting body 91 is formed as a sheet. The flexible circuit board 92 is attached to a top of the supporting body 91. The flexible circuit board 92 comprises a data chip 94 and a fingerprint identifying module 95 electrically connected with the data chip 94. The cover sheet 93 is securely mounted on a top of the flexible circuit board 92 and comprises a chip window 931 and an identifying window 932 to allow the data chip 94 and the fingerprint identify module 95 to be exposed from the windows 931,932 respectively. The fingerprint identifying module 95 comprises an identifying chip 951 and a flexible electrical connection sheet 952 electrically connected with the identifying chip 951. A holding element 96 is mounted between the cover sheet 93 and the identifying chip 951 to hold the identifying chip 951 in position.

However, the identifying chip 951 is attached to the flexible circuit board 92 without any supporting element to support the identifying chip 951. When a user pushes a finger onto the identifying chip 951 with a large force or when the smart card is held in a purse or pocket of a user, the smart card is easily bent and the fingerprint identifying module 95 is easily damaged. Therefore, the conventional smart card 90 is not durable, is easily damaged, and loses the identifying function.

To overcome the shortcomings, the present invention tends to provide a smart card to mitigate or obviate the aforementioned problems.

SUMMARY OF THE INVENTION

The main objective of the invention is to provide a smart card that is not easily bent and damaged.

The smart card has a supporting body, a flexible circuit board, a holding frame, a fingerprint identifying module, and a cover sheet. The supporting body is formed as a flexible sheet and has a top. The flexible circuit board is attached to the top of the supporting body and has a data chip and a top. The holding frame is mounted on the flexible circuit board and has a periphery, a holding recess, and an opening. The holding recess is defined in the holding frame and has a side wall. The opening is defined through the side wall and communicates with the holding recess. The fingerprint identifying module is mounted in the holding frame and has an identifying chip, a flexible electrical connection sheet, and a hard supporting board. The identifying chip corresponds to the holding recess in shape. The flexible electrical connection sheet is electrically connected with the identifying chip, extends out of the opening, and is electrically connected with the flexible circuit board. The supporting board is mounted below the identifying chip to provide a supporting effect to the identifying chip. The cover sheet is attached to the top of the flexible circuit board and has an identifying window and an inner surface. The identifying window is defined through the cover sheet and corresponds to the identifying chip in position to allow the identifying chip to be exposed from the identifying window. The inner surface abuts the periphery of the holding frame.

Other objects, advantages and novel features of the invention will become more apparent from the following detailed description when taken in conjunction with the accompanying drawings.

DETAILED DESCRIPTION OF PREFERRED EMBODIMENT

Figure 1:
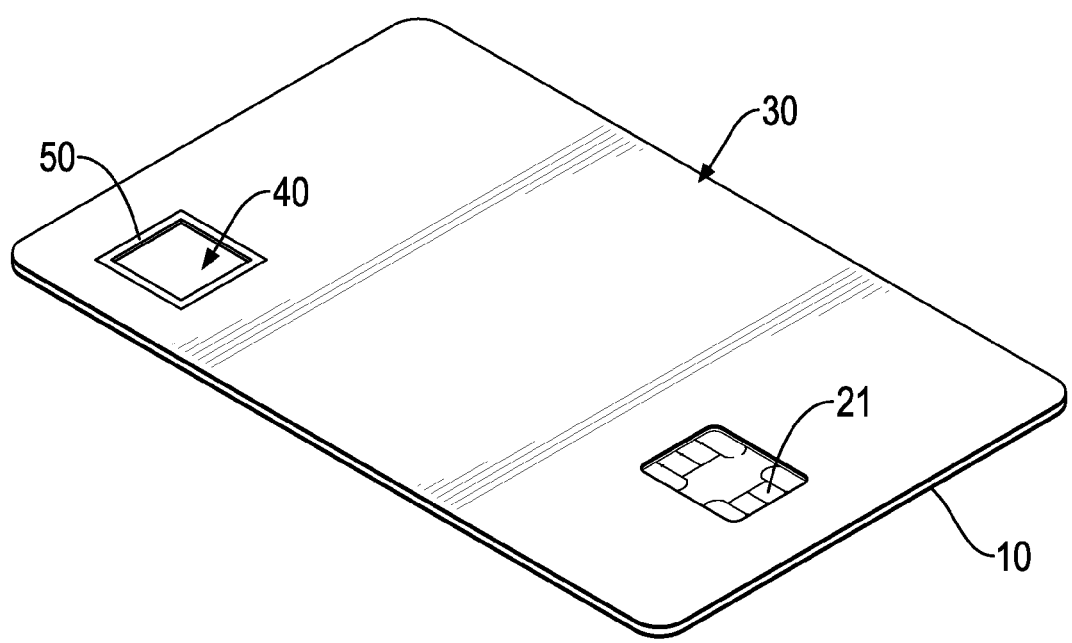
FIG. 1 is a perspective view of a first embodiment of a smart card in accordance with the present invention.

With reference to FIGS. 1 to 4, a smart card in accordance with the present invention comprises a supporting body 10, a flexible circuit board 20, a holding frame 50, a fingerprint identifying module 40, and a cover sheet 30. The components of the smart card in accordance with the present invention may be securely combined with each other by a heat pressing process.

The supporting body 10 is formed as a flexible sheet and has a top. The flexible circuit board 20 is securely attached to the top of the supporting body 10 and has a data chip 21 and a top. The flexible circuit board 20 may comprise circuits and memory units. The data chip 21, the circuits, and the memory units of the flexible circuit board 20 may be conventional, so the detailed description of the flexible circuit board 20 is omitted.

The holding frame 50 is mounted on the flexible circuit board 20 and comprises a periphery, a holding recess 51, and an opening 54. The holding frame 50 may be made of a metal sheet or plastic material to form as a single part and to have a sufficient stiffness. Preferably, the holding frame 50 is made of a metal sheet with a pressing process. The holding recess 51 is defined in the holding frame 50 and has a side wall. In addition, the holding frame 50 further has an annular flange 52 and an annular channel 53. The annular flange 52 is formed around the periphery of the holding frame 50. The annular channel 53 is defined in the annular flange 52 and around the holding frame 50. The opening 54 is defined through the side wall of the holding frame 50 and communicates with the holding recess 51.

The fingerprint identifying module 40 is securely mounted in the holding frame 50 and comprises an identifying chip 41, a flexible electrical connection sheet 42, and a supporting board 43. The fingerprint identifying module 40 has a thickness shorter than a depth of the holding recess 51 in the holding frame 50. The identifying chip 41 corresponds to the holding recess 51 in shape and is securely held in the holding recess 51 with glue. The flexible electrical connection sheet 42 is electrically connected with the identifying chip 41, extends out of the opening 54, and is electrically connected with the flexible circuit board 20. The supporting board 43 is hard and is mounted below the identifying chip 41 to provide a supporting effect to the identifying chip 41. In the first embodiment, the identifying chip 41 and the supporting board 43 are attached respectively to two sides of the flexible electrical connection sheet 42. The supporting board 43 may be made of metal sheet, plastic sheet or complex material sheet to provide a sufficient stiffness for supporting the identifying chip 41. The supporting board 43 has a length longer than a length of the identifying chip 41 to provide a supporting effect to the identifying chip 41 and a part of the flexible electrical connection sheet 42. The supporting board 43 has an end extending out of the opening 54 in the holding frame 50.

The cover sheet 30 is securely attached to the top of the flexible circuit board 20, has a shape and a size same as those of the supporting body 10, and comprises a data chip window 31, an identifying window 32, and an inner surface.

The data chip window 31 is defined through the cover sheet 30, corresponds to the data chip 21 in position to allow the data chip 21 to be exposed from the data chip window 31. The identifying window 32 is defined through the cover sheet 30 and corresponds to the identifying chip 41 in position to allow the identifying chip 41 to be exposed from the identifying window 32. The inner surface abuts the periphery of the holding frame 50 and preferably abuts the annular flange 52 of the holding frame 50. Accordingly, the holding frame 50 is held securely between the cover sheet 30 and the flexible circuit board 20.

Figure 2:
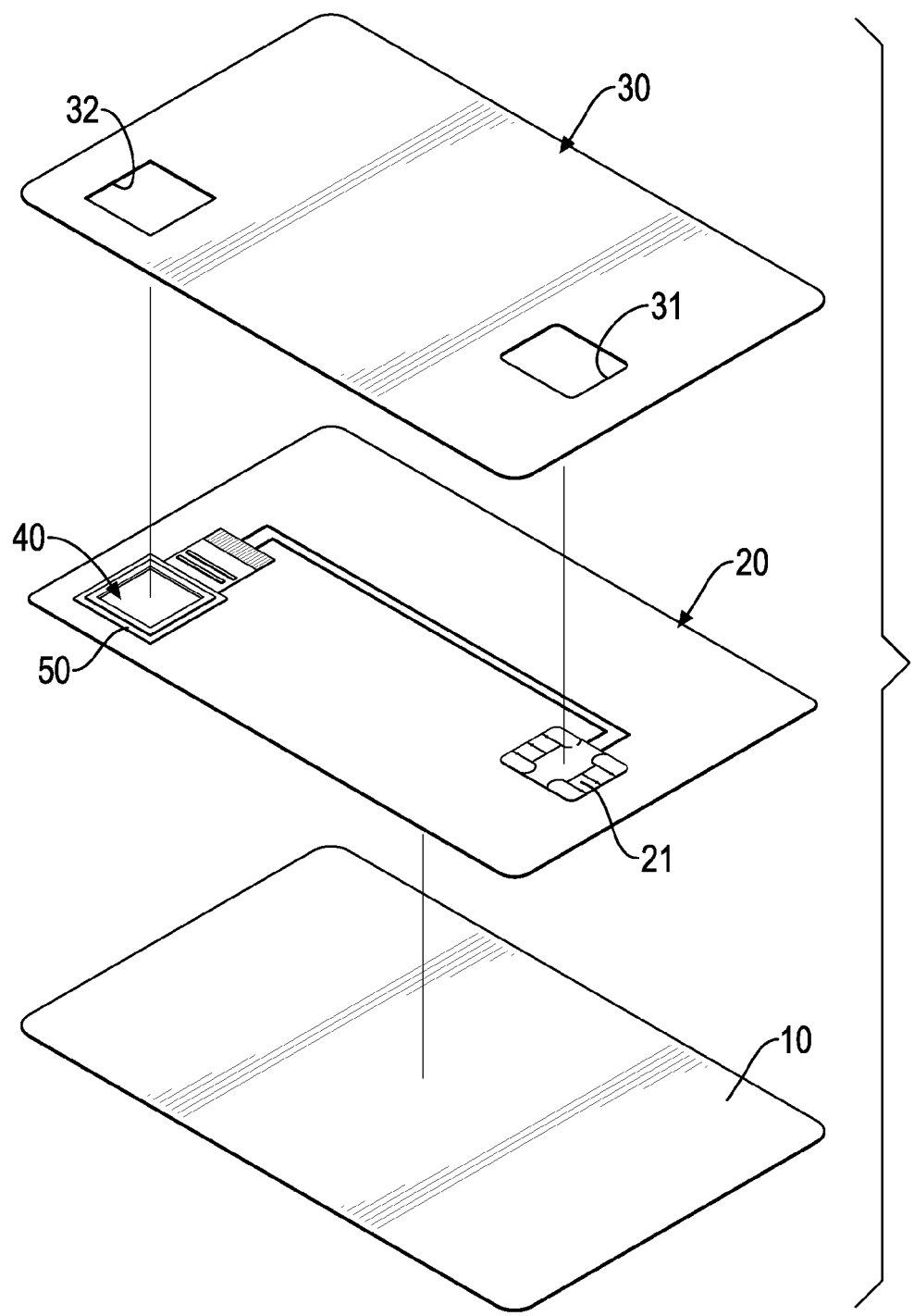
FIG. 2 is an exploded perspective view of the smart card in FIG. 1.
Figure 3:
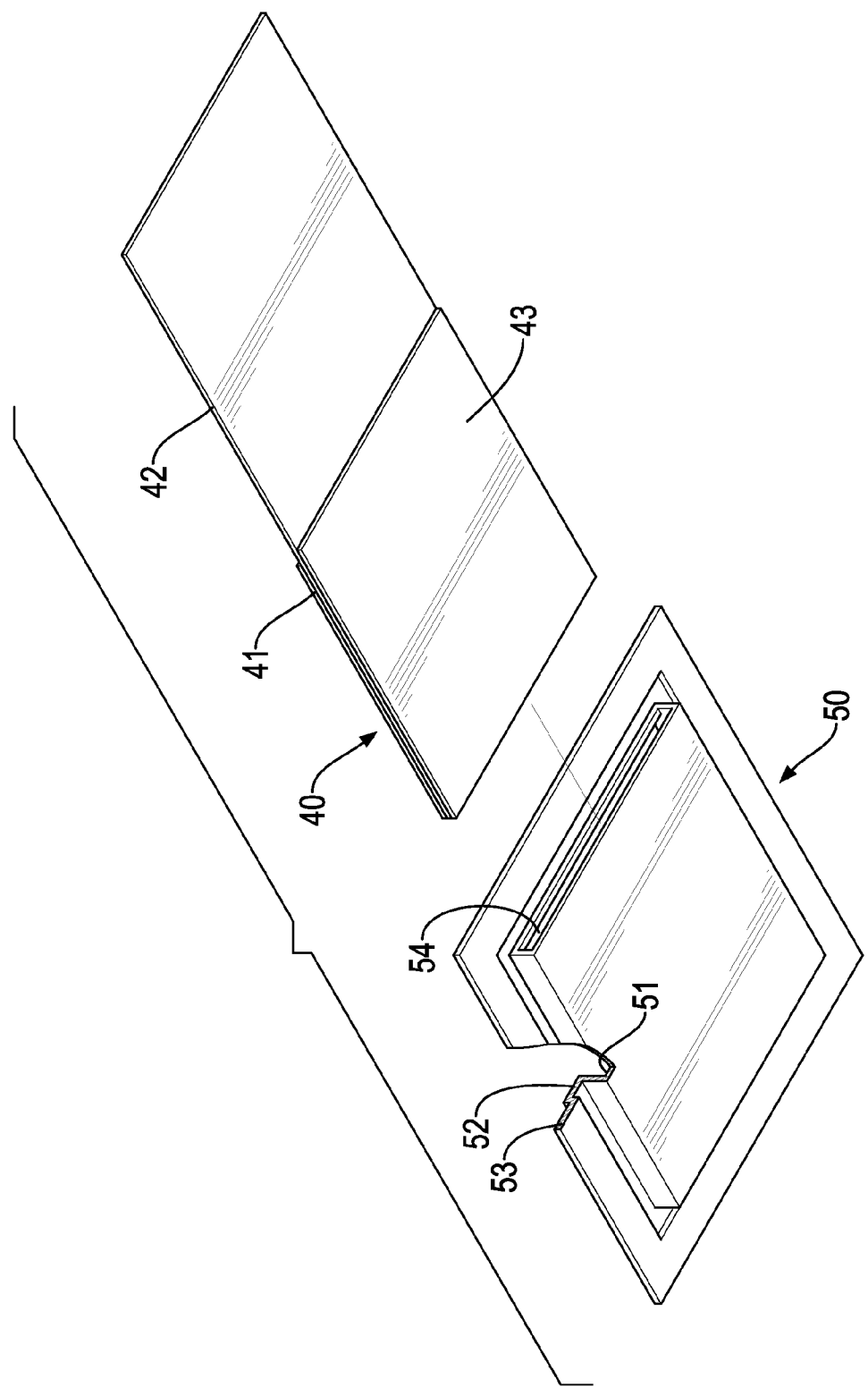
FIG. 3 is an enlarged exploded perspective view of a fingerprint identifying module and a holding frame of the smart card in FIG. 2.
Figure 4:
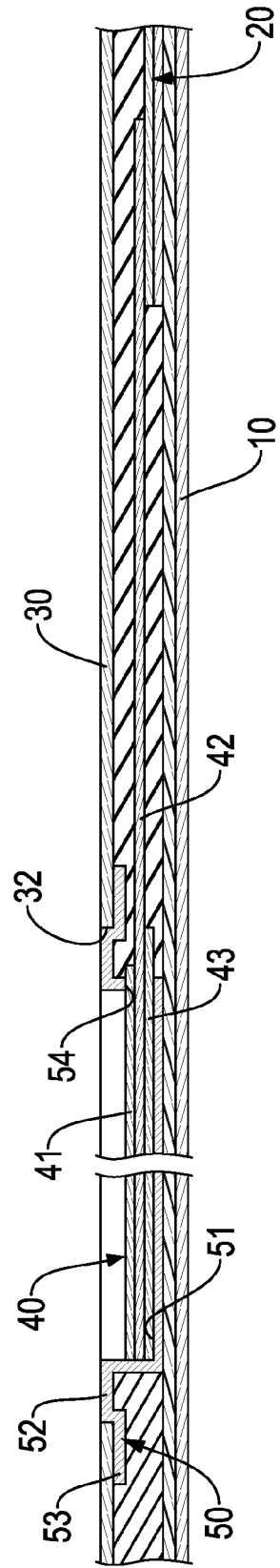
FIG. 4 is an enlarged cross sectional side view of the smart card in FIG. 1.

With reference to FIGS. 2 to 4, to assemble the smart card in accordance with the present invention, the fingerprint identifying module 40 is inserted into and is securely held in the holding recess 51 of the holding frame 50 with glue and via the opening 54. The holding frame 50 is then securely attached to the flexible circuit board 20, and all of the components of the smart card are put into a mold and are combined together to form the smart card with a heat pressing process. With the fingerprint identifying module 40 held in the holding recess 51 of the holding frame 50 and the inner surface of the cover sheet 30 abutting against the periphery of the holding frame 50, the assembling process for the smart card can be simplified and the structure of the smart card is durable.

With reference to FIGS. 1, 2, and 4, the holding frame 50 can provide a stable and durable supporting effect to the fingerprint identifying module 40, such that the force provided by a user pushing against the fingerprint identifying module 40 can be sufficiently borne. Accordingly, the fingerprint identifying module 40 can be prevented from being damaged during the use of the smart card. In addition, if the smart card is bent, the holding frame 50 can protect the fingerprint identifying module 40 from being bent and damaged. Therefore, the smart card in accordance with the present invention is durable in use.

Figure 5:
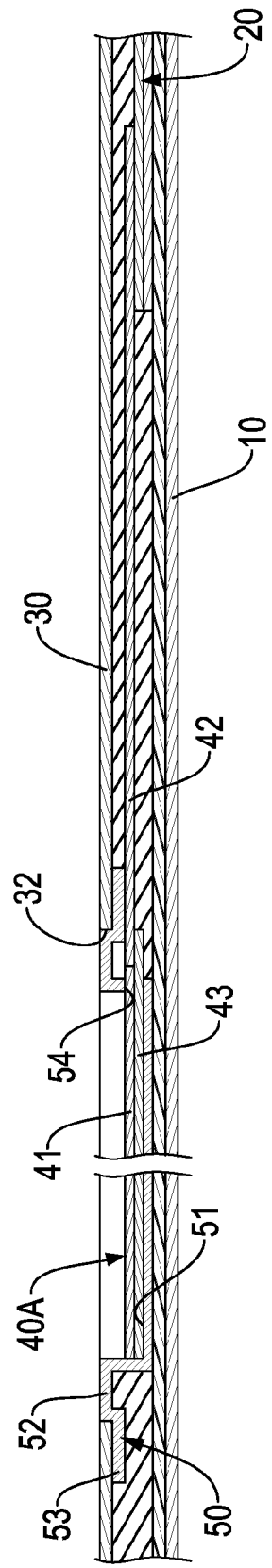
FIG. 5 is cross sectional side view of a second embodiment of a smart card in accordance with the present invention.

With reference to FIG. 5, in the second embodiment, the identifying chip 41 of the fingerprint identifying module 40A is mounted in a hole defined in the flexible electrical connection sheet 42 and has an edge connected with the flexible electrical connection sheet 42. The supporting board 43 is attached to a bottom surface of the identifying chip 41 directly and has a length longer than that of the identifying chip 41 to provide a sufficient supporting effect to the identifying chip 41.

Figure 6:
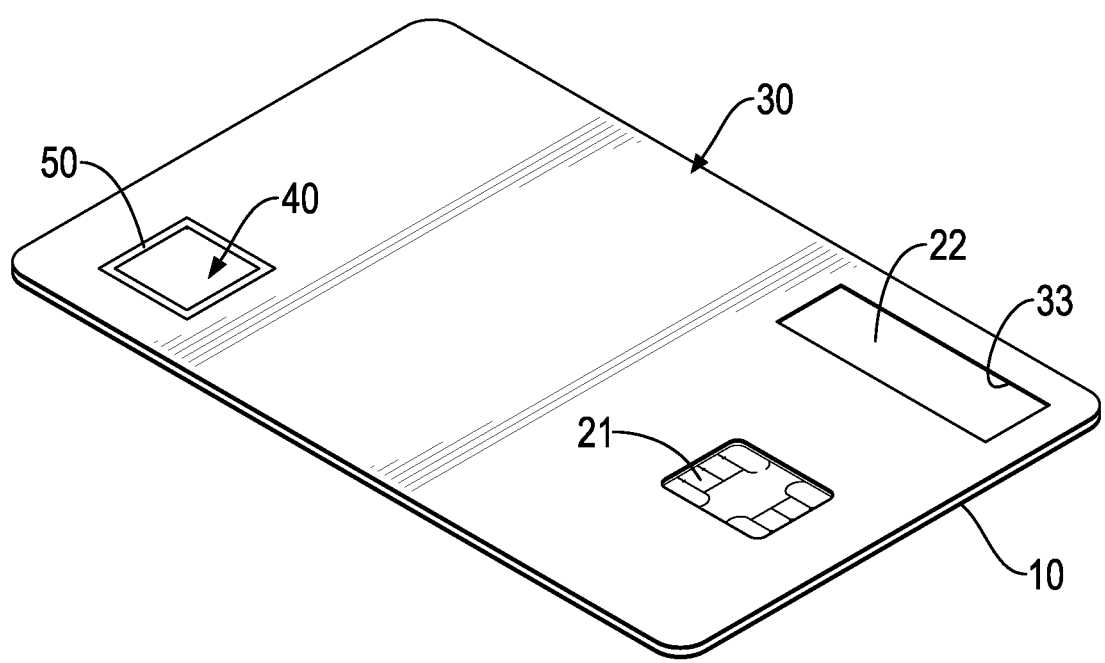
FIG. 6 is a perspective view of a third embodiment of a smart card in accordance with the present invention.
Figure 7:
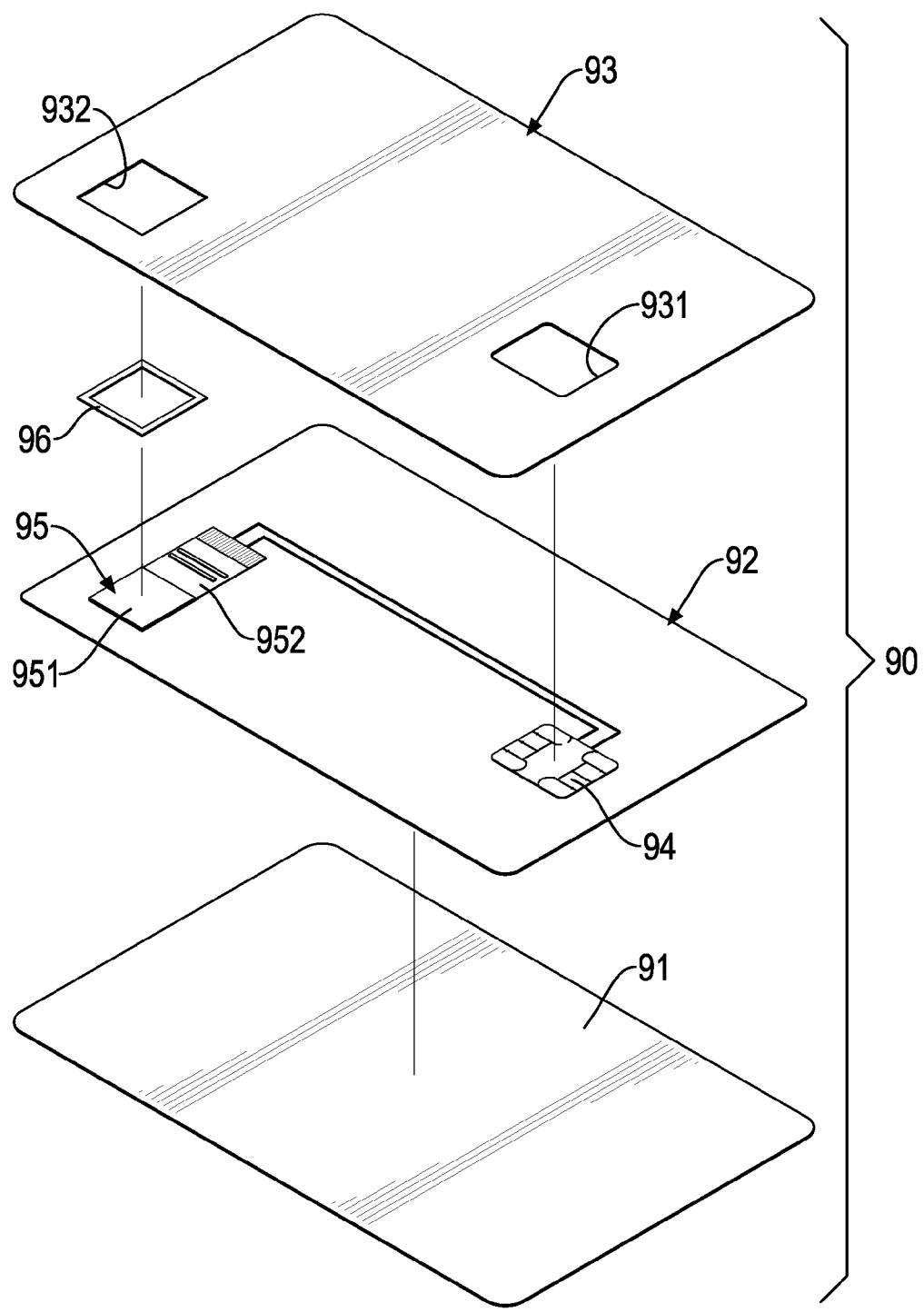
FIG. 7 is an exploded perspective view of a conventional smart card.

With reference to FIG. 6, in the third embodiment, the smart card further has a display 22, and the cover sheet 30 has a display window 33 to allow the display 22 to be exposed from the display window 33.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A smart card comprising:
    a supporting body formed as a flexible sheet and having a top;
    a flexible circuit board attached to the top of the supporting body and having a data chip and a top;
    a holding frame mounted on the flexible circuit board and comprising
        a periphery;
        a holding recess defined in the holding frame and having a side wall; and
        an opening defined through the side wall and communicating with the holding recess;
    a fingerprint identifying module mounted in the holding frame and having
        an identifying chip corresponding to the holding recess in shape;
        a flexible electrical connection sheet electrically connected with the identifying chip, extending out of the opening, and electrically connected with the flexible circuit board; and
        a hard supporting board mounted below the identifying chip to provide a supporting effect to the identifying chip; and
    a cover sheet attached to the top of the flexible circuit board and having
        an identifying window defined through the cover sheet and corresponding to the identifying chip in position to allow the identifying chip to be exposed from the identifying window; and
        an inner surface abutting the periphery of the holding frame.

2. The smart card as claimed in claim 1, wherein the holding frame further has
    an annular flange formed around the periphery of the holding frame and abutting the inner surface of the cover sheet; and
    an annular channel defined in the annular flange and around the holding frame.

3. The smart card as claimed in claim 2, wherein the holding frame is formed as a single part by a metal sheet with a pressing process.

4. The smart card as claimed in claim 3, wherein the holding recess has a depth larger than a thickness of the fingerprint identifying module.

5. The smart card as claimed in claim 4, wherein the supporting board has a length longer than a length of the identifying chip to provide a supporting effect to the identifying chip and a part of the flexible electrical connection sheet; and
    the supporting board has an end extending out of the opening in the holding frame.

6. The smart card as claimed in claim 5, wherein the identifying chip and the supporting board are attached respectively to two sides of the flexible electrical connection sheet.

7. The smart card as claimed in claim 5, wherein the identifying chip is mounted in a hole defined in the flexible electrical connection sheet and has an edge connected with the flexible electrical connection sheet; and the supporting board is attached to a bottom surface of the identifying chip.

8. The smart card as claimed in claim 1, wherein the supporting board has a length longer than a length of the identifying chip to provide a supporting effect to the identifying chip and a part of the flexible electrical connection sheet; and the supporting board has an end extending out of the opening in the holding frame.

9. The smart card as claimed in claim 8, wherein the identifying chip and the supporting board are attached respectively to two sides of the flexible electrical connection sheet.

10. The smart card as claimed in claim 8, wherein the identifying chip is mounted in a hole defined in the flexible electrical connection sheet and has an edge connected with the flexible electrical connection sheet; and the supporting board is attached to a bottom surface of the identifying chip.

* * * * *